United States Patent
Okamura (10) Patent No.: US 7,599,141 B2
(45) Date of Patent: Oct. 6, 2009

(54) DISK DRIVE APPARATUS, ELECTRONIC CIRCUIT FOR DISK DRIVE APPARATUS AND POWERING METHOD THEREFOR

(75) Inventor: Hiroshi Okamura, Sunnyvale, CA (US)

(73) Assignee: Kabushiki Kaisha Toshiba, Minatoku Tokyo (JP)

( * ) Notice: Subject to any disclaimer, the term of this patent is extended or adjusted under 35 U.S.C. 154(b) by 197 days.

(21) Appl. No.: 11/692,807

(22) Filed: Mar. 28, 2007

(65) Prior Publication Data

US 2008/0239547 A1 Oct. 2, 2008

(51) Int. Cl.
G11B 15/18 (2006.01)

(52) U.S. Cl. .................................................... 360/69

(58) Field of Classification Search .............. 360/69, 360/31, 75, 51, 77.02, 72.1, 245.9
See application file for complete search history.

(56) References Cited

U.S. PATENT DOCUMENTS

| | | | |
|---|---|---|---|
| 5,787,292 A * | 7/1998 | Ottesen et al. | 713/300 |
| 5,801,894 A * | 9/1998 | Boutaghou et al. | 360/72.1 |
| 6,097,559 A * | 8/2000 | Ottesen et al. | 360/31 |
| 6,122,131 A * | 9/2000 | Jeppson | 360/77.02 |
| 6,717,763 B2 * | 4/2004 | Ottesen et al. | 360/75 |
| 6,754,023 B2 * | 6/2004 | Tokuyama et al. | 360/69 |
| 6,781,783 B2 * | 8/2004 | Amano et al. | 360/75 |
| 6,804,183 B2 * | 10/2004 | Ikeda et al. | 369/53.37 |
| 6,859,340 B2 * | 2/2005 | Brittner et al. | 360/75 |
| 6,912,102 B2 * | 6/2005 | Tokuyama et al. | 360/69 |
| 6,937,419 B2 * | 8/2005 | Suk et al. | 360/75 |
| 7,136,242 B1 * | 11/2006 | Chue et al. | 360/51 |
| 2007/0097552 A1 * | 5/2007 | Lee et al. | 360/245.9 |
| 2007/0201155 A1 * | 8/2007 | Iwase | 360/31 |

FOREIGN PATENT DOCUMENTS

| | | |
|---|---|---|
| JP | 2002319102 | 10/2002 |
| JP | 2003208701 | 7/2003 |

* cited by examiner

Primary Examiner—Fred Tzeng
(74) Attorney, Agent, or Firm—Schwegman, Lundberg & Woessner, P.A.

(57) ABSTRACT

According to one embodiment, a disk drive apparatus includes a disk having a plurality of tracks formed of approximately concentric patterns, a head slider reading and writing data from and to the disk, a motor driver configured to move the head slider to a target position on the disk, an electronic circuit configured to transfer the data to and from a host computer, and a power source configured to provide power to the electronic circuit based upon a position of the head slider.

16 Claims, 8 Drawing Sheets

| ZONE | Voltage |
|------|---------|
| Z0 | H (1.4V) |
| Z1 | H (1.4V) |
| Z2 | L (1.2V) |
| Z3 | L (1.2V) |

FIG. 10

DISK DRIVE APPARATUS, ELECTRONIC CIRCUIT FOR DISK DRIVE APPARATUS AND POWERING METHOD THEREFOR

FIELD

The present invention relates to a disk drive device having information recording media.

BACKGROUND

A disk drive is an information storage device. A disk drive includes one or more disks clamped to a rotating spindle, and at least one head for reading information representing data from and/or writing data to the surfaces of each disk. The head is supported by a suspension coupled to an actuator that may be driven by a voice coil motor. Control electronics in the disk drive provide electrical pulses to the voice coil motor to move the head to desired positions on the disks to read and write the data, and to park the head in a safe area when not in use or when otherwise desired for protection of the disk drive.

Disk drive devices are finding their way into a large variety of battery powered and portable devices, where minimizing power consumption is desired. Many disk drives have various modes of power conservation, including removing power from a spindle motor when the drive has not been used for a predetermined time. However, electronics in disk drive devices may also consume significant power. There is a need for reducing power consumption by disk drive electronics.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Hereinafter, example embodiments of the present invention will be described with reference to the drawings.

Figure 1:
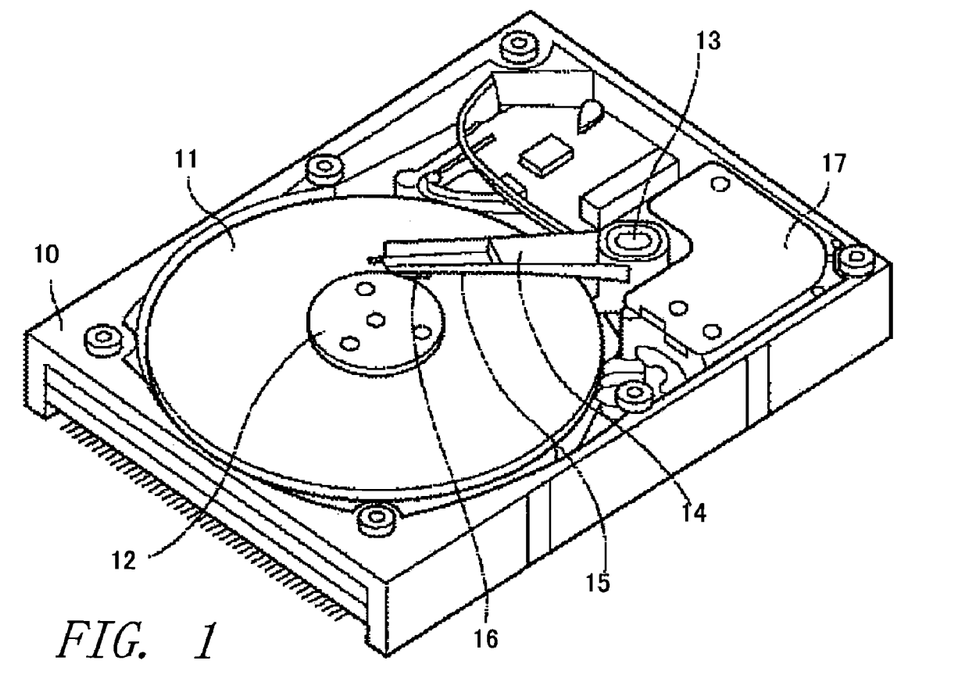
FIG. 1 is a perspective view of a magnetic recording and reproducing apparatus (hard disk drive) according to an embodiment.

FIG. 1 is a perspective view of a magnetic recording and reproducing apparatus (hard disk drive) according to an embodiment. The magnetic recording and reproducing apparatus comprises, inside a chassis 10, a magnetic disk 11, a head slider 16 including a read head and a write head, a head suspension assembly (a suspension 15 and an actuator arm 14) that supports the head slider 16, a voice coil motor (VCM) 17 and a circuit board.

The magnetic disk 11 is mounted on and rotated by a spindle motor 12. Various digital data are recorded on the magnetic disk 11 in perpendicular magnetic recording manner. In an example embodiment, the magnetic head incorporated in the head slider 16 is a so-called integrated head including a write head of a single pole structure and a read head using a shielded MR read element (such as a GMR film or a TMR film). The suspension 15 is held at one end of the actuator arm 14 to support the head slider 16 so as to face the recording surface of the magnetic disk 11. The actuator arm 14 is attached to a pivot 13. The voice coil motor (VCM) 17, which serves as an actuator, is provided at the other end of the actuator 14. The voice coil motor (VCM) 17 drives the head suspension assembly to position the magnetic head at an arbitrary radial position of the magnetic disk 11. The circuit board comprises a head IC to generate driving signals for the voice coil motor (VCM) and control signals for controlling read and write operations performed by the magnetic head.

Figure 2:
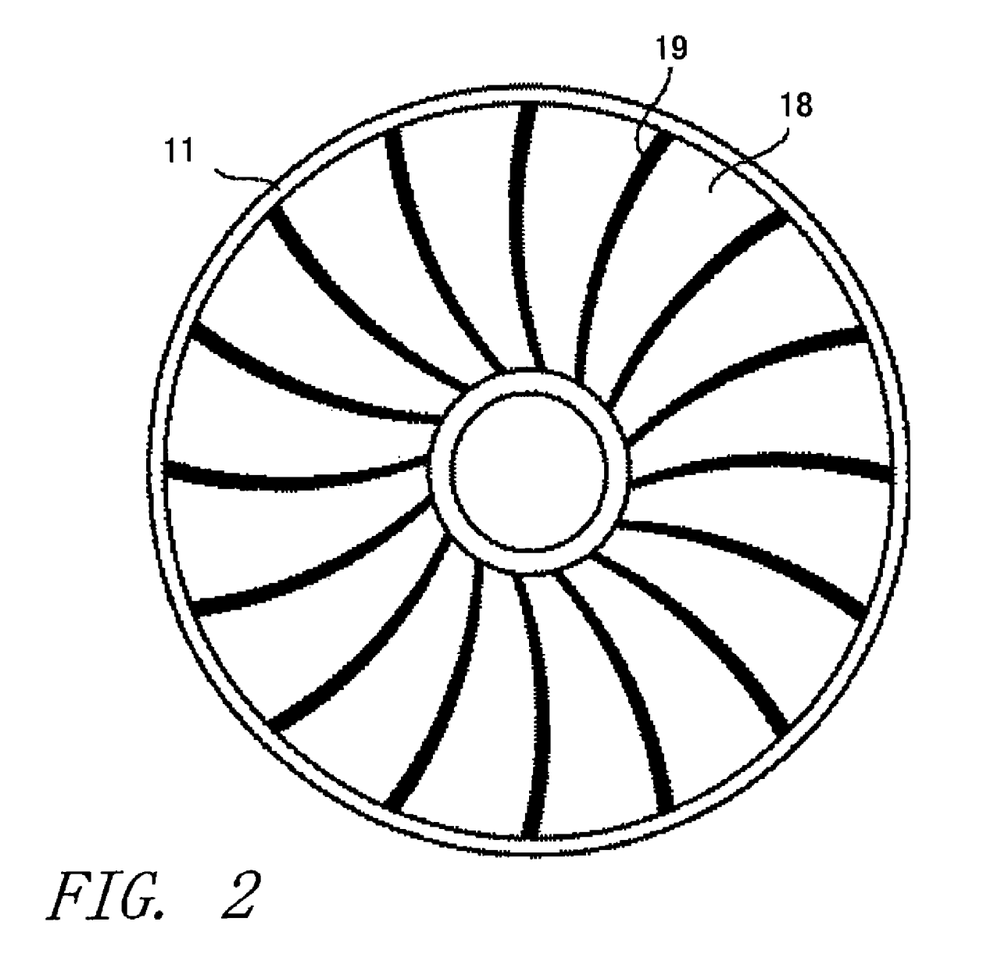
FIG. 2 is a schematic plan view of a magnetic disk according to an embodiment.

FIG. 2 is a schematic plan view of a magnetic disk 11 according to an embodiment. FIG. 2 shows data zones 18 and servo zones 19. User data is recorded in each of the data zones 18. Servo data for head positioning is recorded in each of the servo zones 19. On the disk surface, the servo zone 19 is shaped like a circular arc corresponding to a locus of a head slider during access.

Figure 3:
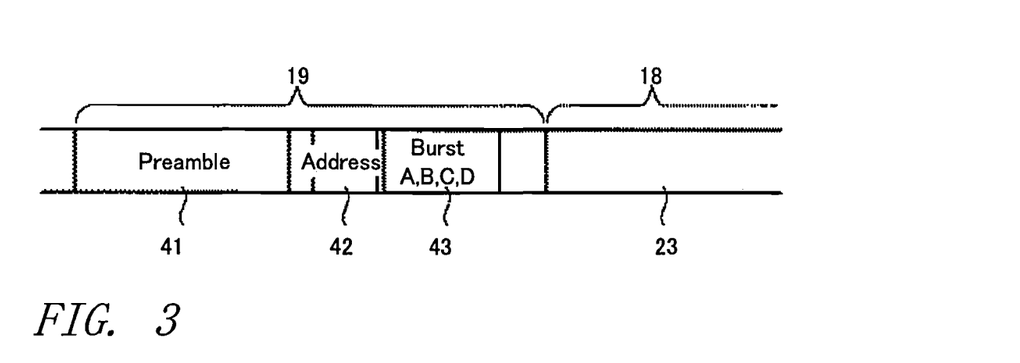
FIG. 3 is a schematic diagram showing a servo zone and a data zone in a magnetic disk according to an embodiment.
Figure 4:
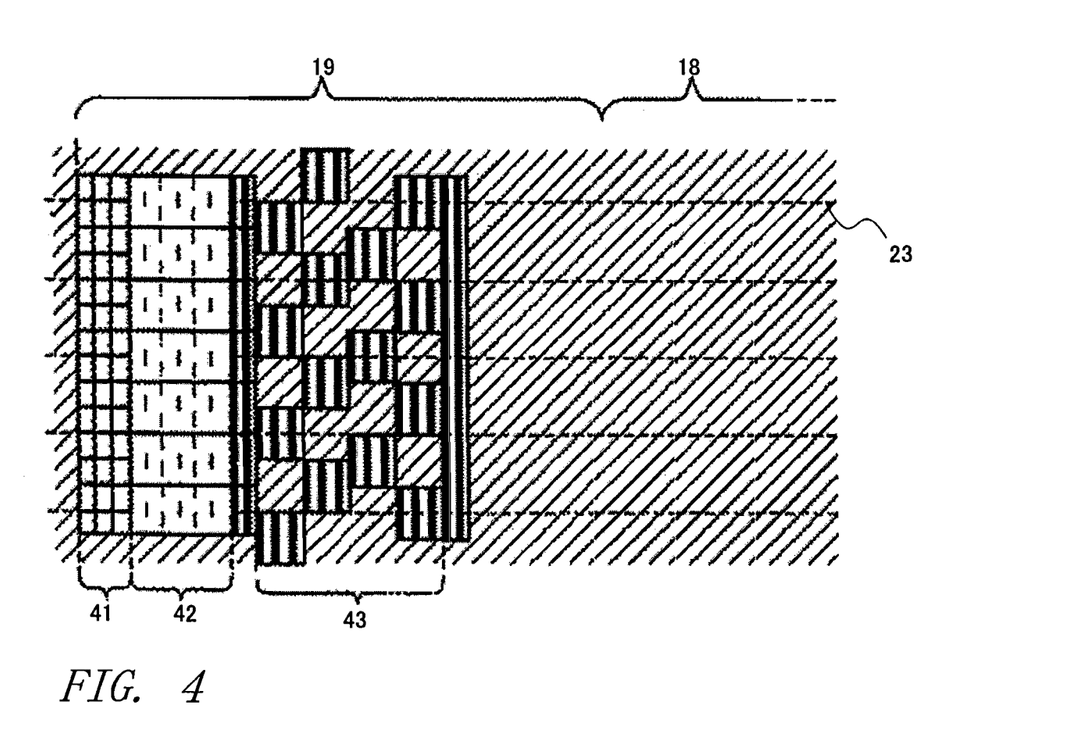
FIG. 4 is a plan view showing patterns in a servo zone and a data zone in a magnetic disk according to an embodiment.

With reference to FIGS. 3 and 4, the patterns of the servo zone and data zone will be described. As schematically shown in FIG. 3, the servo zone 19 is shown to include a preamble section 41, an address section 42, and a burst section 43 for detecting deviation.

The preamble section 41 is provided to execute a PLL process for synthesizing a clock for a servo signal read relative to deviation caused by rotational deflection of the media, and an AGC process for maintaining appropriate signal amplitude.

The address section 42 may have servo signal recognition codes called servo marks, sector data, cylinder data, and the like formed at the same pitch as that of the preamble section 41 in the circumferential direction using Manchester encoding. In particular, since the cylinder data has a pattern exhibiting a data varied for every servo track, it may be recorded using Manchester encoding after being converted into Gray codes providing the minimum difference between adjacent tracks so as to reduce the adverse effect of address reading errors during a seek operation.

The burst section 43 is an off-track detecting region used to detect the amount of off-track with respect to the on-track state for a cylinder address. The burst section 43 is shown by way of example to have four fields of burst marks (called an A, B, C, and D bursts), whose pattern phases in a radial direction are shifted to each other in respective fields. Plural marks are arranged at the same pitch as that of the preamble section in the circumferential direction. The radial period of each burst is proportional to the period at which the address pattern changes, in other words, the servo track period. According to the present example embodiment, respective bursts are formed in a length of 10 periods in the circumferential direction. The bursts are repeated in the radial direction in a period twice as long as the servo track period. In the burst section 43, the occupancy rate of the magnetic material is approximately 75%.

The principle of detection of a position on the basis of the burst section 43 will not be described in detail. The off-track amount is obtained by calculating the average amplitude value of read signals from the A, B, C, and D bursts.

Figure 5:
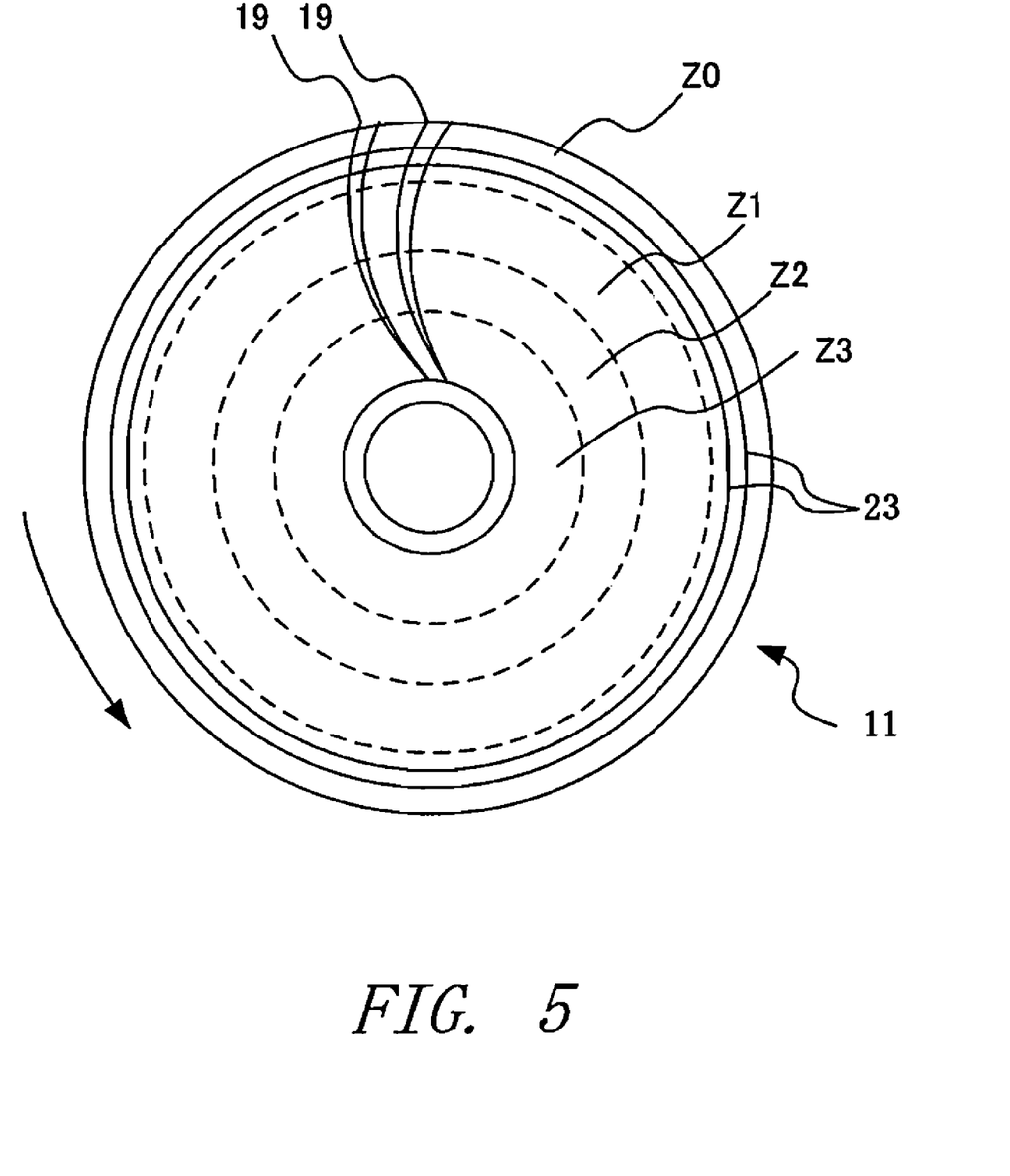
FIG. 5 is a schematic diagram showing a magnetic disk adopting a zone bit recording system.

FIG. 5 is a view explaining the magnetic disk 11 according to this example embodiment. FIG. 5 shows the magnetic disk 11 adopting a zone bit recording system. Disk drive apparatus is applied constant linear density recording (CDR) method to increase area density. The magnetic disk 11 is partitioned to the zones Z0 to Z3 in the circumferential direction. Note that this number of zones does not reflect that of an actual magnetic disk, but the zones are schematically shown.

The magnetic disk 11 also includes a plurality of tracks on each disk surface. The plurality of tracks is depicted by two example tracks, such as track 23 on the surface of the magnetic disk 11. The servo zones 19 traverse the plurality of tracks, such as track 23, on the magnetic disk 11. The plurality of tracks, in some example embodiments, may be arranged as a set of substantially concentric circles. Data is stored in fixed sectors along a track between the embedded servo zones 19. The tracks on the magnetic disk 11 each include a plurality of data sectors. More specifically, a data sector is a portion of a track having a fixed block length and a fixed data storage capacity (e.g. 512 bytes of user data per data sector). The tracks toward the inside of the magnetic disk 11 are not as long as the tracks toward the periphery of the magnetic disk 11. As a result, the tracks toward the inside of the magnetic disk 11 can not hold as many data sectors as the tracks toward the periphery of the magnetic disk 11. Tracks that are capable of holding the same number of data sectors are grouped into data zones such as Z0, Z1, Z2 and Z3. Since the density and data rates vary from data zone to data zone, the servo zones 19 may interrupt and split up at least some of the data sectors.

At outer tracks, the disk drive will have a much higher read rate than at the inside tracks. Similarly, the disk drive will have a much higher write rate at the outer tracks than at the inside tracks.

Figure 6:
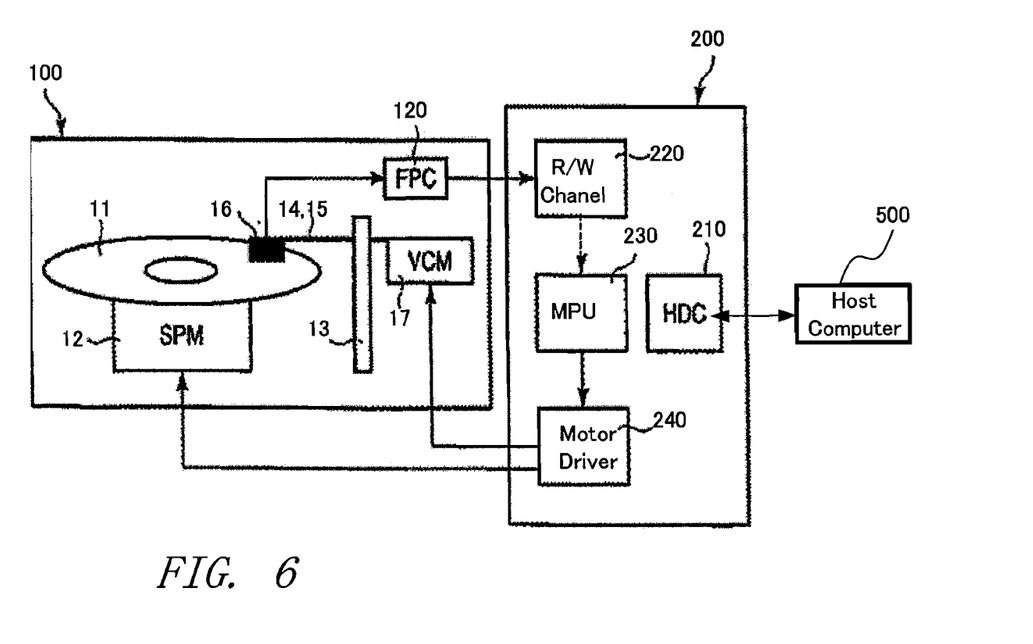
FIG. 6 is a block diagram of the magnetic recording and reproducing apparatus (hard disk drive) according to an embodiment.

FIG. 6 shows a block diagram of the magnetic recording and reproducing apparatus (hard disk drive) according to an example embodiment. This figure shows the head slider only above the top surface of the magnetic disk. However, the perpendicular magnetic recording layer is formed on each side of the magnetic disk. A down head and an up head are provided above the bottom and top surfaces of the magnetic disk, respectively.

The disk drive includes a main body unit called a head disk assembly (HDA) 100 and a printed circuit board (PCB) 200.

As shown in FIG. 6, the head disk assembly (HDA) 100 has the magnetic disk 11, the spindle motor 12, which rotates the magnetic disk, the head slider 16, including the read head and the write head, the suspension 15 and actuator arm 14, the voice coil motor (VCM) 17, and a head amplifier (HIC), which is not shown. The head slider 16 is provided with the read head including the GMR element 31 and the write head including the single pole 32, which are shown in FIG. 3.

The head slider 16 is elastically supported by a gimbal provided on the suspension 15. The suspension 15 is attached to the actuator arm 14, which is rotatably attached to the pivot 13. The voice coil motor (VCM) 17 generates a torque around the pivot 13 for the actuator arm 14 to move the head in the radial direction of the magnetic disk 11. The head amplifier (HIC) is fixed to the actuator arm 14 to amplify input signals to and output signals from the head. The head amplifier (HIC) is connected to the printed circuit board (PCB) 200 via a flexible print cable (FPC) 120. Providing the head amplifier (HIC) on the actuator arm 14 enables to reduce noise in the head signals effectively. However, the head amplifier (HIC) may be fixed to the HDA main body.

As described above, the perpendicular magnetic recording layer is formed on each side of the magnetic disk 11, and the servo zones each shaped like a circular arc are formed so as to correspond to the locus of the moving head. The specifications of the magnetic disk meet outer and inner diameters and read/write characteristics adapted to a particular drive. The radius of the circular arc formed by the servo zone is given as the distance from the pivot to the magnet head element.

In the illustrated example embodiment, four major electronic components, so-called system LSIs, are mounted on the printed circuit board (PCB) 200. The system LSIs are a disk controller (HDC) 210, a read/write channel IC 220, a MPU 230, and a motor driver IC 240.

The MPU 230 is a control unit of a driving system and includes ROM, RAM, CPU, and a logic processing unit which implement a head positioning control system according to the present embodiment. The logic processing unit is an arithmetic processing unit composed of a hardware circuit to execute high-speed calculations. Firmware (FW) for the logic processing circuit is saved to the ROM. The MPU controls the drive in accordance with FW.

The disk controller (HDC) 210 is an interface unit in the hard disk drive which manages the whole drive by exchanging information with interfaces between the disk drive and a host computer 500 (for example, a personal computer) and with the MPU 230, read/write channel IC 220, and motor driver IC 240.

The read/write channel IC 220 is a head signal processing unit relating to read/write operations. The read/write channel IC 220 is composed of a circuit which switches the channels of the head amplifier (HIC) and which processes read/write signals in read/write operations.

The motor driver IC 240 is a driver unit for the voice coil motor (VCM) 17 and spindle motor 12. The motor driver IC 240 controls the spindle motor 12 so that the motor 12 can rotate at a constant speed and provides a current, which is determined based on a VCM manipulating variable from the MPU 230, to VCM 17 to drive the head moving mechanism.

Figure 7:
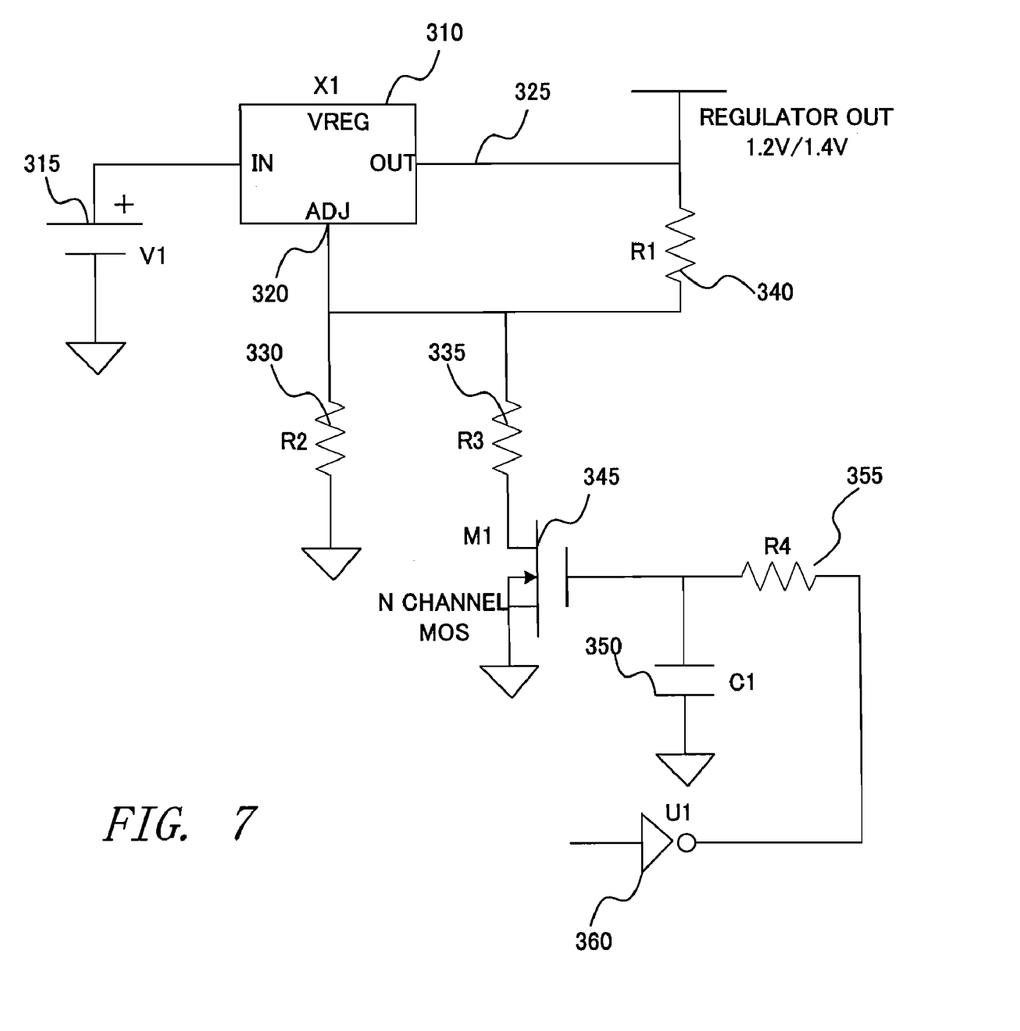
FIG. 7 is a block schematic diagram of a switching voltage regulator for a disk drive device according to an example embodiment.

In this example embodiment, power for electronic components such as read/write channel IC 220 of the above disk drive is provided by a switching regulator circuit as shown at 300 in FIG. 7. A target voltage is provided as a function of a feedback voltage, which may be switched between two or more values to provide different target voltages.

A voltage regulator 310 is coupled to a supply voltage 315. Regulator 310 has an input 320 for adjusting an output voltage provided at 325. Input 320 is coupled to a filtered control signal switched between two fixed values formed by the combination of resistor 330, resistor 335 and resistor 340. Resistor 340 is coupled to the output voltage and to the input 320. Resistors 330 and 335 are controllably coupled to the input in parallel, effectively forming a variable voltage divider between resistor 340 and the selective parallel combination of resistors 330 and 335.

An N channel MOS transistor 345 is used as a switch to toggle between the two fixed voltage states comprising the control signal at input 320. Transistor 345 in an on state, allows current to flow through resistor 335, creating a parallel path for current through both resistors 330 and 335, resulting in a higher control voltage being provided to input 320. When transistor 345 is off, substantially all the current flows through resistor 330, resulting in a lower control voltage provided to input 320 corresponding to a higher regulator output 325. In one example embodiment, the regulator voltage may be toggled between approximately 1.2 volts and 1.4 volts. In further example embodiments, additional resistors (or resistors having different resistances) and switches may be provided to allow for additional regulator voltage output levels.

In one example embodiment, an additional filter formed is formed by capacitor 350 and resistor 355 coupled to an input of transistor 345. This RC filter may be used to slowly transition between the two target voltage levels, as controlled by an input signal via an input 360, which in one example embodiment is a device, such as an inverter that provides an appropriate level signal to either turn transistor 345 on or off.

In one example embodiment, the time constant of the RC filter formed by the capacitor 350 and the resistor 355 is large enough to prevent significant transient events from occurring internal to the voltage regulator 310. The slowly ramped target voltage may substantially reduce the transient currents by limiting the magnitude of any voltage error detected by the voltage regulator 310. This allows switching between two voltage amplitudes based on the desired range of functionality required by the drive.

When the read head or the write head of the head slider 16 is positioned proximate the inner tracks and either reading or writing, the channel will not have to be powered to the same level as when the head is at or near outer tracks. Therefore, the reduced power is supplied to the read/write channel IC 220 when the read head or the write head of the head slider 16 is positioned at the inner tracks. Of course, different power levels may be used for different zones across the disk. In this example embodiment, the voltage regulator 310 provides different desired target voltages for powering the read/write channel IC 220 depending on disk data transfer rate.

Figure 8:
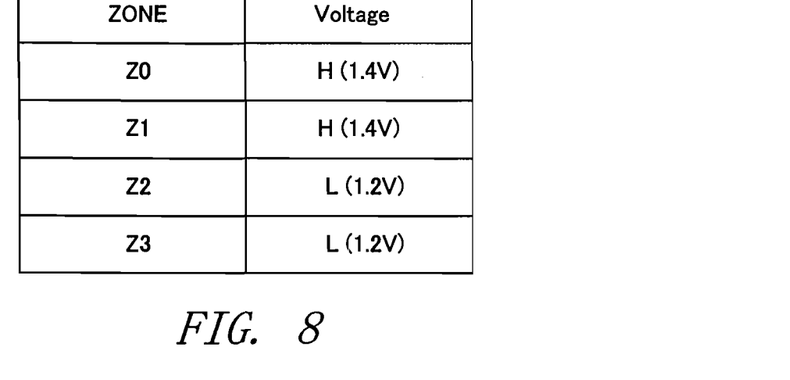
FIG. 8 shows a table of voltages applied to the read/write channel IC and zones.

FIG. 8 shows a table of example supplied voltages to the read/write channel IC 220 and zones Z0 to Z3. A voltage of 1.4V is supplied to the read/write channel IC 220 when the read head or the write head of the head slider 16 is positioned in either one of zone Z0 or Z1 and reads or writes data on the disk. If the read head or the write head of the head slider 16 is positioned in either one of zone Z2 or Z3 and reads or writes data on the disk, the voltage regulator 310 controls a target voltage so that a lower voltage of 1.2V is supplied to the read/write channel IC 220.

Figure 9:
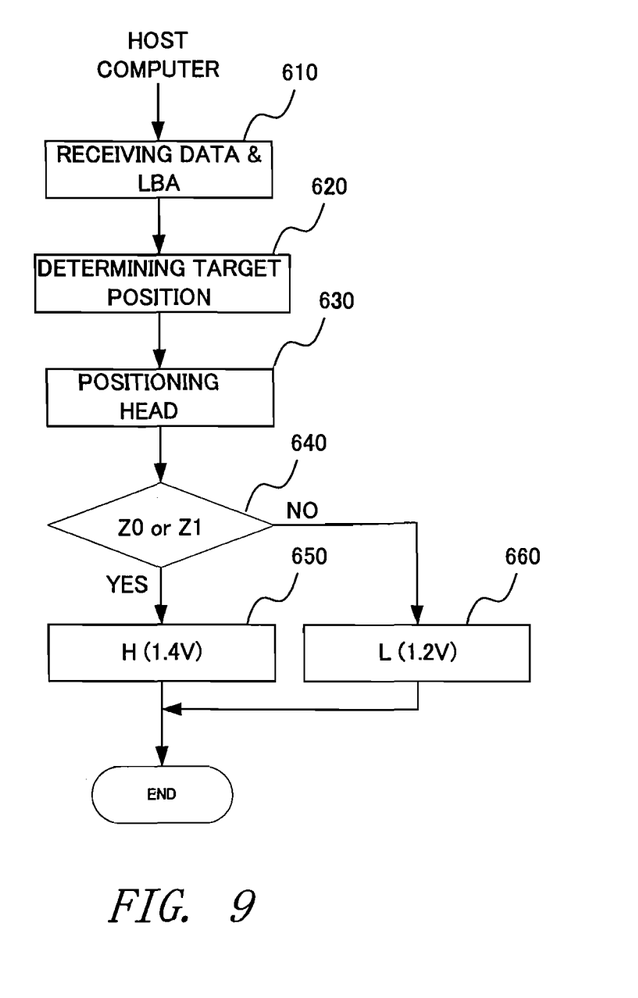
FIG. 9 is a flowchart of a method of providing power to the read/write channel IC in accordance with an example embodiment.

FIG. 9 is a flowchart showing an example method of providing power to the read/write channel IC 220.

HDC 210 receives instructions to read or write data from the host computer 500 and also receives a LBA (Logical Block Address) identifying a position to read or write the data (Block 610). A target track of the head slider 16 is calculated by the received LBA and it is determined which one of zones Z0, Z1, Z2, and Z3 corresponds to the target track (Block 620). The VCM 17 is controlled to move the head slider 16 to the target track (Block 630). While the head slider 16 is moving to the target track, a voltage supplied to the read/write channel IC 220 is determined using, for example, a table shown in FIG. 8 (Block 640). If the target track belongs to either one of zone Z0 or Z1, the voltage regulator 310 is controlled to supply a voltage of 1.4V to the read/write channel IC 220 (Block 650). If the target track belongs to the other zones, the voltage regulator 310 is controlled to supply a voltage of 1.2V to the read/write channel IC 220 (Block 660).

Figure 10:
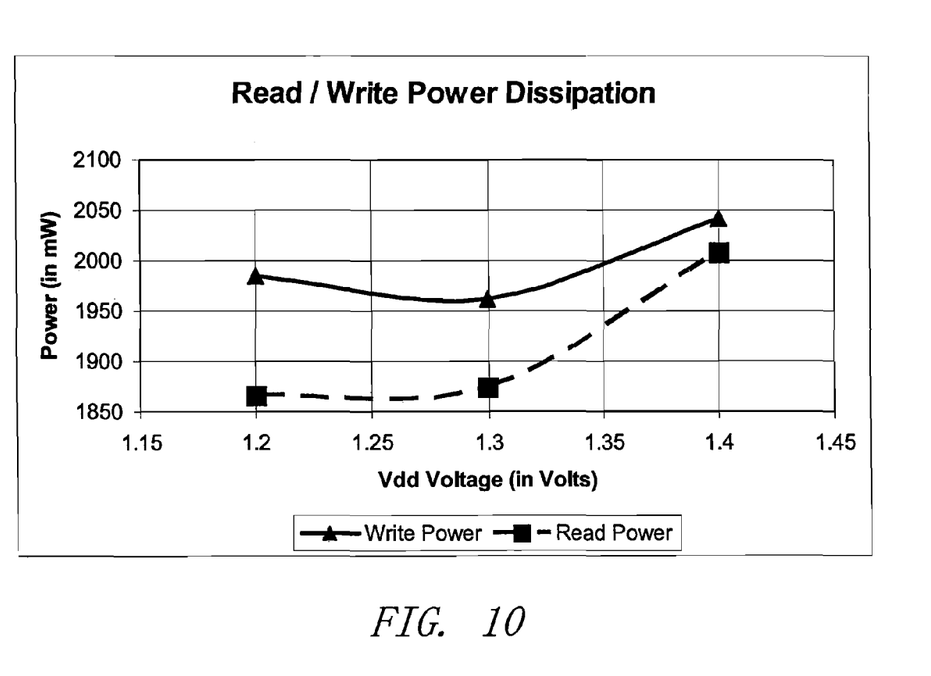
FIG. 10 shows a read/write power dissipation of the read/write channel IC.

FIG. 10 shows an example read/write power dissipation of the read/write channel IC 220. According to FIG. 10, power dissipation can be reduced by switching to a lower voltage of 1.2V applied to the read/write channel IC 220 when the head slider 16 is positioned at the inner tracks. In an example embodiment, since more than 5% power saving is expected while reading data, it is desirable that this embodiment be implemented into a mobile audio player or a mobile video player with built-in disk drive.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A disk drive apparatus comprising:
   a disk having a plurality of tracks formed of approximately concentric patterns;
   a head slider to read and write data from and to the disk;
   a motor driver configured to move the head slider to a target position on the disk;
   an electronic circuit configured to process read/write data in a read/write operation; and
   a power source configured to provide power to the electronic circuit based upon a data transfer rate for a position of the head slider.

2. The disk drive apparatus according to claim 1, wherein the power source is configured to provide lower power to the electronic circuit when the head slider is positioned proximate the inner tracks than power to the electronic circuit when the head slider is positioned proximate the outer tracks.

3. The disk drive apparatus according to claim 1, wherein the power source provides power to the electronic circuit based upon the track at which the head slider is positioned.

4. The disk drive apparatus according to claim 1, wherein the power source provides power to the electronic circuit based upon a zone in which the head slider is positioned.

5. The disk drive apparatus according to claim 1, wherein the electronic circuit comprises a read/write channel IC.

6. An electronic circuit for a disk drive apparatus including a disk having a plurality of tracks formed of approximately concentric patterns and a head slider to read and write data from and to the disk, the electronic circuit comprising:
   a first circuit configured to process read/write data in a read/write operation; and
   a power source configured to provide power to the first circuit based upon a data transfer rate for a given position of the head slider.

7. The electronic circuit according to claim 6, further comprising, a motor driver configured to move the head slider to a target position on the disk.

8. The electronic circuit according to claim 6, wherein the power source provides lower power to the first circuit when the head slider is positioned at the inner tracks than power to the first circuit when the head slider is positioned at the outer tracks.

9. The electronic circuit according to claim 6, wherein the power source provides power to the first circuit based upon the track at which the head slider is positioned.

10. The disk drive according to claim 6, wherein the power source provides power to the first circuit based upon a zone in which the head slider is positioned.

11. The disk drive according to claim 6, wherein the first circuit comprises a read/write channel IC.

12. A method of powering an electronic circuit for a disk drive apparatus including a disk having a plurality of tracks formed of approximately concentric patterns and a head slider reading and writing data from and to the disk, the method comprising:
   determining a target position of the head slider, the target position being related to a data transfer rate; and
   powering the electronic circuit based upon the target position.

13. The method of claim 12, further comprising:
providing the electronic circuit with lower power when the head slider is positioned proximate to the inner tracks than power to the first circuit when the head slider is positioned proximate to the outer tracks.

14. The method of claim 12, wherein the electronic circuit is provided with power based upon the track at which the head slider is positioned.

15. The method of claim 12, wherein the electronic circuit is provided with power based upon a zone in which the head slider is positioned.

16. The method of claim 12, wherein the electronic circuit comprises a read/write channel IC.

* * * * *